April 17, 1956  N. J. SOLLOWAY  2,742,081
COMBINED SADDLES AND PILLION SEATS FOR MOTOR CYCLES
Filed June 2, 1952
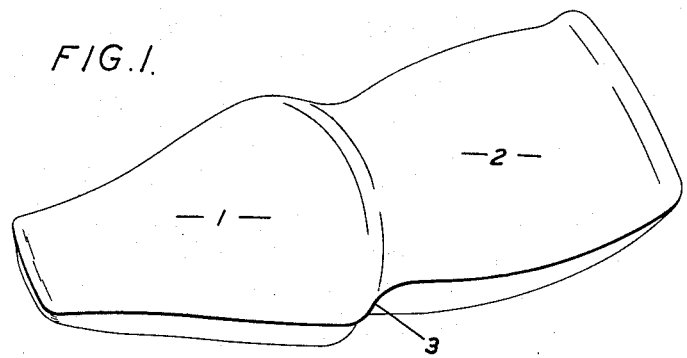
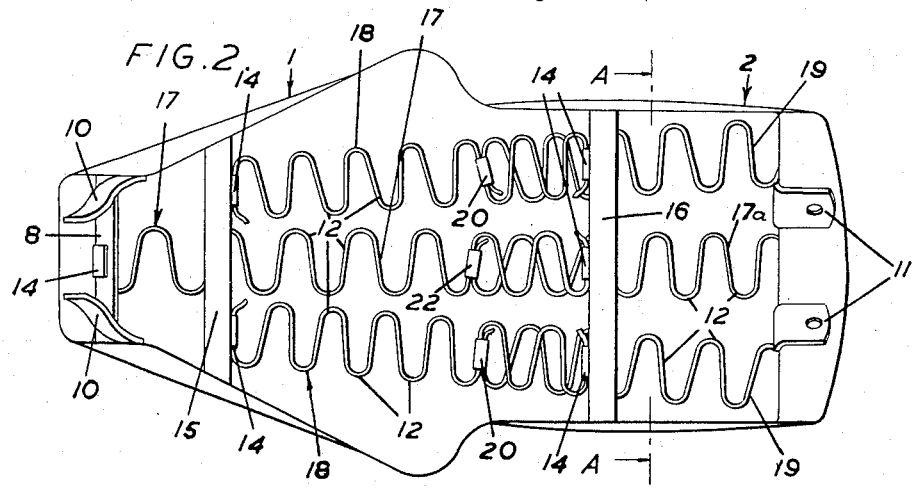
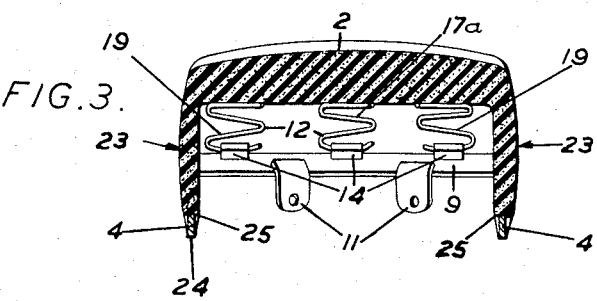
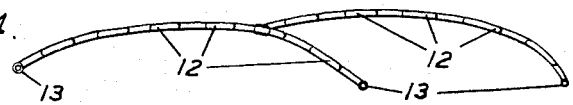
Norman John Solloway
Inventor
his Attorneys, April 17, 1956  N. J. SOLLOWAY  2,742,081
COMBINED SADDLES AND PILLION SEATS FOR MOTOR CYCLES
Filed June 2, 1952  2 Sheets-Sheet 2
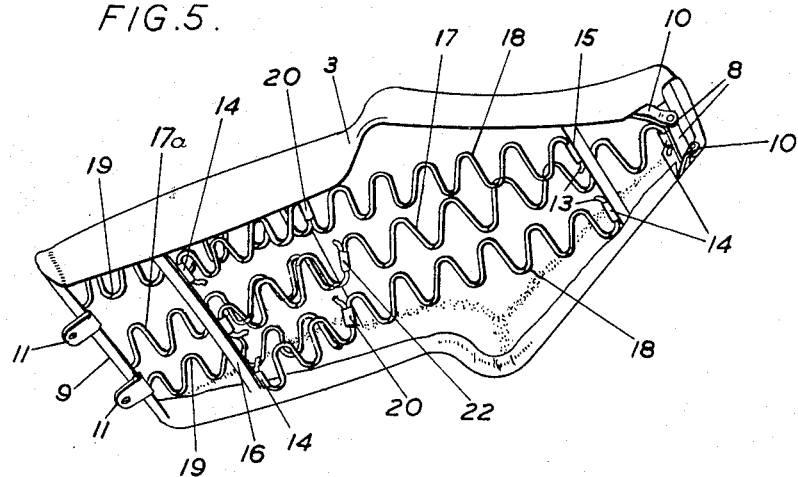
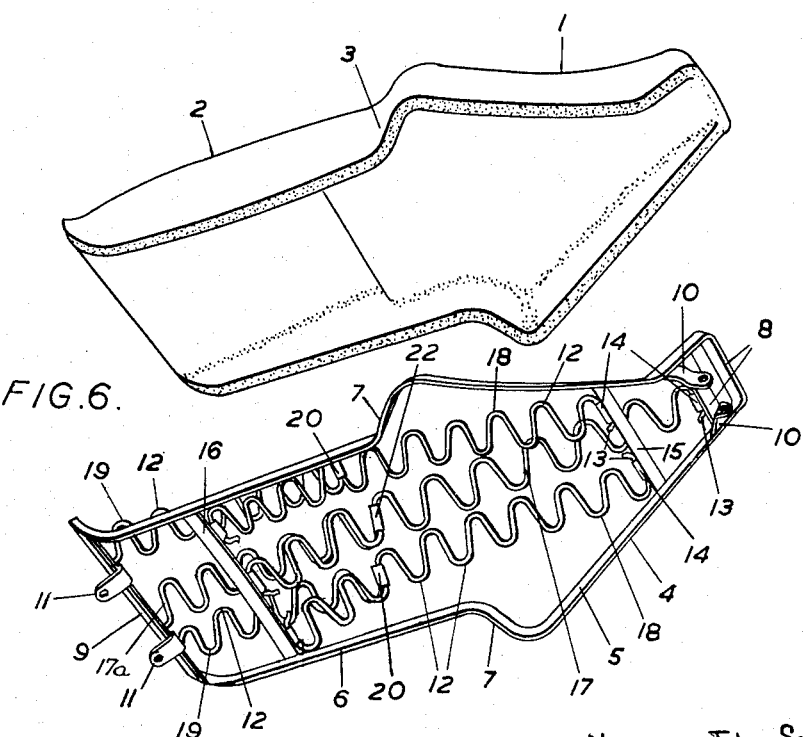
Norman John Solloway
Inventor
By
Richardson, David and Nordon
his Attorneys

# United States Patent Office 2,742,081
Patented Apr. 17, 1956

2,742,081

COMBINED SADDLES AND PILLION SEATS FOR MOTOR CYCLES

Norman John Solloway, Birmingham, England, assignor to Feridax Limited, Birmingham, England, a British company Application June 2, 1952, Serial No. 291,211

4 Claims. (Cl. 155—5.12)

This invention has reference to a combined saddle and pillion seat for a motor cycle and is particularly, although not exclusively, applicable to a combined saddle and pillion seat in which knee grips are provided between the junction of the back of the saddle and the front of the seat as disclosed in the specification of British Letters Patent No. 510,738 granted to J. R. Ferriday.

One of the objects of the invention is to provide a combined saddle and pillion seat which offers greater comfort for the riders than those combined saddles and seats now available.

The invention consists of a combined saddle and pillion seat for a motor cycle which consists of a combination of parts which are specifically described in the description of the drawings hereinafter appearing and as set forth in the claims.

A satisfactory embodiment of the invention is illustrated by way of example on the accompanying drawings:

Fig. 1 is a perspective view of the combined saddle and seat.

Fig. 2 is an underneath view of Fig. 1.

Fig. 3 is a section of Fig. 2 taken on the dotted line A—A.

Fig. 4 is an elevation of a part of the springing system.

Fig. 5 is a perspective underside view of Fig. 2.

Fig. 6 is an exploded view showing the frame and spring system and the cushion.

In an embodiment of the invention shown in the drawings, a combined saddle and seat made of sponge rubber has knee rests 3 formed by a waisted or narrowed portion at the junction of the back of the saddle 1 and the front of the pillion seat 2. A rigid frame 4 made of strip steel welded at its abutting ends has conforming saddle and seat areas 5, 6 and a waisted part 7 conforming to the knee rests 3; transverse bars 8, 9 form opposite ends of the frame and form the peak of the saddle 1 and the back of the seat 2.

Lugs 10 attached to the frame 4 are adapted to connect the saddle 1 to the frame of a motor cycle or a part attached thereto and lugs 11 on the bar 9 serve for attaching the seat 2 to the rear mudguard of the cycle.

Arranged longitudinally in and supported from the frame 4 are steel wire springs each consisting of a convex member formed with several zig-zag loops or corrugations 12 extending for the entire length of each spring; the saddle and seat 1, 2 rest on these springs. The terminations of the springs are bent inwardly at 13 and are connected by brackets 14 to the bars 8, 9 or to intermediate tie bars or straps 15, 16.

The frame 4 and the bars or straps 15, 16 constitute a rigid skeleton structure of which the straps 15, 16 serve as means for connecting the ends of certain of the zig-zag springs whereas the frame 4 forms a supporting structure for the sponge rubber saddle and seat.

It will be more particularly seen from Figs. 2 and 5 that a central main spring 17 in the saddle area 5 extends between and is connected at its ends to the straps 8, 16, that on each side of the spring 17 a spring 18 is connected at its ends to the transverse straps 15, 16 and that two springs 19 in the seat area 6 one arranged on each side of the main spring 17 are connected at one end of the bar 9 and at the other end to intermediate points 20 of the outer springs 18 related to the saddle area.

With this arrangement, the saddle area 5 and the seat area 6 are independently sprung. A central spring 17a in the seat area 6, is also connected at one end to the bar 9 and at the other end to an intermediate point 22 of the spring 17.

The combined saddle and seat 1, 2 is moulded in sponge rubber as a shallow tray (Fig. 6) and its base fits upon the top of the spring system and its depending sides extend to the sides of the frame 4; this sponge rubber moulding is held in engagement with the spring system by means of a flexible cover 23 which extends over the top, sides and ends of the rubber moulding and its boundary edge 24 is turned back on the frame 4 and cemented at 25 to the sponge rubber moulding.

It will be appreciated that the saddle and seat areas 1, 2 are elastically and independently supported throughout their length and mainly over their width and as a result an increased measure of comfort both for the rider and pillion rider is ensured.

When the saddle and seat is under load, the convex springs are deformed and tend to flatten and the zig-zag loops or corrugations 12 contract and expand as the load is relieved.

It will be appreciated by those skilled in the art, that the shape of the frame referred to in the claims as "shaped in conformity with the external shapes of a conventional motor cycle saddle and a pillion seat of a motor cycle" connotes a saddle shaped with a narrow forward end and a relatively broad rear end and a pillion seat shaped as a rectangle or trapesoid.

The invention is not to be regarded as limited to the number of springs described and illustrated since more or less can be provided according to the size and design of the saddle and seat.

I claim:

1. A combined saddle and pillion seat comprising a rigid frame shaped in conformity with the external shapes of a conventional saddle and a conventional pillion seat of a motor cycle arranged one behind the other, a system of steel wire springs arranged in and supported from said frame and extending longitudinally thereof, said springs consisting of convex members each having a continuation of zig zag loops, the forward ends of the springs in the pillion seat shape of said frame being connected to loops belonging to springs appertaining to the saddle shape of said frame so as to form independently sprung saddle and pillion seat areas, and a moulded rubber seat shaped to conform with the shape of the said frame and resting on said spring saddle and sprung pillion seat areas of said convex springing system and having depending sides extending to the sides of said frame and means for connecting said rubber seat to said frame.

2. A combined saddle and pillion seat according to claim 1, in which the said frame has bars connected laterally thereto, said bars serving as supports for ends of some of the said springs.

3. A combined saddle and pillion seat according to claim 1 in which the means for connecting said rubber seat to said frame consists of a flexible cover which extends over the top and the sides of the rubber seat, the boundary edge of said cover being turned back over said frame and being cemented to said rubber seat.

4. A combined saddle and pillion seat comprising a rigid frame shaped in conformity with the external shapes of a conventional saddle and a conventional pillion seat of a motor cycle arranged one behind the other, and having a waisted portion at the back of the saddle shape and the front of the pillion seat shape of said frame, a system of steel wire springs arranged in and supported from said frame and extending longitudinally thereof, said springs consisting of convex members each having a continuation of zig zag loops, the forward ends of the springs in the said pillion seat shape being connected to loops belonging to springs appertaining to the saddle shape of said frame so as to form independently sprung saddle and pillion seat areas, and a moulded rubber seat shaped to conform with the shape of said frame and resting on said sprung saddle and sprung pillion seat areas of said convex springing system and having depending sides extending to the sides of said frame, and means for connecting said rubber seat to said frame.

References Cited in the file of this patent

UNITED STATES PATENTS

| | | |
|---|---|---|
| Re. 21,263 | Kaden | Nov. 14, 1939 |
| 2,324,976 | Soper | July 20, 1943 |
| 2,514,182 | Flint | July 4, 1950 |
| 2,591,185 | Neely | Apr. 1, 1952 |

FOREIGN PATENTS

| | | |
|---|---|---|
| 510,738 | Great Britain | Aug. 8, 1939 |
| 645,815 | Great Britain | Nov. 8, 1950 |